United States Patent
Gauthier (10) Patent No.: US 9,268,311 B2
(45) Date of Patent: Feb. 23, 2016

(54) ORAL TIMER AND METHOD OF USING SAME

(71) Applicant: Pierre-Pascal Gauthier, Anjou (CA)

(72) Inventor: Pierre-Pascal Gauthier, Anjou (CA)

( * ) Notice: Subject to any disclaimer, the term of this patent is extended or adjusted under 35 U.S.C. 154(b) by 0 days.

(21) Appl. No.: 14/190,680

(22) Filed: Feb. 26, 2014

(65) Prior Publication Data

US 2014/0247702 A1 Sep. 4, 2014

(30) Foreign Application Priority Data

Mar. 4, 2013 (GB) .................................. 1303781.7

(51) Int. Cl.
*A61K 36/537* (2006.01)
*G04F 1/02* (2006.01)
*A23G 4/06* (2006.01)

(52) U.S. Cl.
CPC ... *G04F 1/02* (2013.01); *A23G 4/06* (2013.01)

(58) Field of Classification Search
USPC ........................................................ 424/746
IPC .................................................... A61K 36/537
See application file for complete search history.

(56) References Cited

U.S. PATENT DOCUMENTS

| | | | |
|---|---|---|---|
| 4,454,108 A | 6/1984 | Iida et al. | |
| 4,810,500 A | 3/1989 | Tisdale | |
| 4,865,849 A | 9/1989 | Conte et al. | |
| 5,260,069 A | 11/1993 | Chen | |
| 5,464,633 A | 11/1995 | Conte et al. | |
| 5,487,901 A | 1/1996 | Conte et al. | |
| 5,650,169 A | 7/1997 | Conte et al. | |
| 6,248,760 B1 * | 6/2001 | Wilhelmsen | 514/343 |
| 6,419,952 B2 | 7/2002 | Wong et al. | |
| 6,596,311 B1 * | 7/2003 | Dobetti | 424/464 |
| 6,709,673 B1 | 3/2004 | Tebbe | |
| 6,929,803 B2 | 8/2005 | Wong et al. | |
| 6,960,356 B1 | 11/2005 | Talwar et al. | |
| 7,452,558 B2 * | 11/2008 | Jani et al. | 426/3 |
| 7,943,169 B2 | 5/2011 | Domb et al. | |
| 2001/0016593 A1 | 8/2001 | Wilhelmsen | |
| 2002/0155154 A1 | 10/2002 | Wong et al. | |
| 2004/0247677 A1 * | 12/2004 | Oury et al. | 424/472 |
| 2005/0008690 A1 * | 1/2005 | Miller | 424/451 |
| 2005/0169986 A1 * | 8/2005 | Tian et al. | 424/464 |
| 2005/0202082 A1 * | 9/2005 | Hibino et al. | 424/464 |
| 2005/0287211 A1 * | 12/2005 | Yoshida et al. | 424/469 |
| 2007/0104783 A1 | 5/2007 | Domb et al. | |
| 2007/0152799 A1 | 7/2007 | McDonough | |
| 2007/0183990 A1 * | 8/2007 | Dodds et al. | 424/54 |
| 2007/0184111 A1 | 8/2007 | Harris et al. | |
| 2007/0274927 A1 | 11/2007 | Haley et al. | |

(Continued)

FOREIGN PATENT DOCUMENTS

WO 2012091153 A2 7/2012

*Primary Examiner* — Chris R Tate (57) ABSTRACT

A method for allowing a human subject having a mouth to time a predetermined duration, the method comprising: initiating a first oral sensation in the mouth of the human subject to indicate a beginning of the predetermined duration; and initiating a second oral sensation in the mouth of the human subject to indicate an end of the predetermined duration, the second oral sensation differing from the first oral sensation. Initiations of the first and second oral sensations are separated in time by substantially the predetermined duration. Also, an oral timer for performing the method and a kit including a plurality of the oral timers.

9 Claims, 3 Drawing Sheets

(56) References Cited

U.S. PATENT DOCUMENTS

| | | |
|---|---|---|
| 2008/0107727 A1 | 5/2008 | Nakashima et al. |
| 2008/0199522 A1 | 8/2008 | Sawada et al. |
| 2010/0247644 A1 | 9/2010 | Domb et al. |
| 2011/0229606 A1* | 9/2011 | Shaw et al. ............. 426/87 |
| 2011/0318411 A1* | 12/2011 | Luber et al. ............ 424/464 |
| 2012/0015021 A1 | 1/2012 | Mizrahi et al. |
| 2012/0164280 A1* | 6/2012 | Kamakura et al. ...... 426/103 |
| 2012/0288450 A1* | 11/2012 | Gonzales ................. 424/48 |

\* cited by examiner

ORAL TIMER AND METHOD OF USING SAME

FIELD OF THE INVENTION

The present invention relates generally to timer devices and, more particularly, to an oral timer for generating an indication to a human subject that the end of a predetermined duration has elapsed and a method of using the same.

BACKGROUND

The prior art proposes numerous devices for identifying the end of a predetermined time period. These devices of the prior art generally include mechanical and/or electronic components that can measure a fixed or user selectable time period and generate a visual and/or audible signal at the end thereof. Furthermore, some timer devices of the prior art may generate such signal at the end of each of a series of fixed or user selected time periods.

Typical examples of prior art devices that can be used to identify the end of one or more than one predetermined time period are solar clocks, sand clocks, mechanical or electronic watches, alarm clocks, sport chronometers and kitchen timers.

While these prior art timer devices can generally fulfill the main objective of identifying the end of one or a series of predetermined time periods, the visual and/or audible signal they generate may not be desired during certain types of timed activities. For examples, it may be not desirable to disturb a user with one or more visual and/or audible signals during a meditation or yoga session during which a total state of calmness and relaxation is often the primary objective. There are other activities wherein the identification of time lapses is sometimes required but where a visual and/or audible signal may not be a practical means to signal a user that a preset time period has elapsed. For example, a user may be floating half immersed in total darkness in an isolation tub filled with highly saturated salt water, or a user may be participating in a complex choreography during which his or her visual and hearing senses are already over solicited for other purposes.

Against this background, there exists a need for a new and improved timer.

It is a general object of the present invention to provide such a timer.

SUMMARY OF THE INVENTION

In a broad aspect, the invention provides a method for allowing a human subject having a mouth to time a predetermined duration, the method comprising: initiating a first oral sensation in the mouth of the human subject to indicate a beginning of the predetermined duration; and initiating a second oral sensation in the mouth of the human subject to indicate an end of the predetermined duration, the second oral sensation differing from the first oral sensation. Initiations of the first and second oral sensations are separated in time by at least substantially the predetermined duration.

In a variant, the mouth produces saliva and the first and second oral sensations are created by an oral timer. The oral timer includes a saliva dissolving portion, the second oral sensation being created by the oral timer after at least part of the saliva dissolving portion has been dissolved in the saliva, the saliva dissolving portion being formulated, configured and sized such that a dissolution time required to dissolve the at least part of the saliva dissolving portion is substantially independent of a natural physico-chemical environment in the mouth in the human subject when the human subject is healthy, the dissolution time being the predetermined duration.

In some embodiments of the invention, the first oral sensation is an insertion of the oral timer in the mouth.

In some embodiments of the invention, the second oral sensation is a complete dissolution of the oral timer in the saliva.

In some embodiments of the invention, the oral timer includes an internal layer and an external layer surrounding the internal layer, the oral timer initiating one of the first and second oral sensations when the external layer has been dissolved in the mouth to expose the internal layer.

In some embodiments of the invention, the predetermined duration is a first predetermined duration, the method also allowing timing of a second predetermined duration, the first oral sensation being created when the external layer is intact, the second oral sensation being created when the external layer has been dissolved in the mouth to expose the internal layer, the method further comprising initiating a third oral sensation in the mouth of the human subject to indicate an end of the second predetermined duration, the third oral sensation differing from the second oral sensation, initiating of the second and third oral sensations being separated in time by at least substantially the second predetermined duration.

For example, the one of the first and second oral sensations includes a taste sensation. In another example, the one of the first and second oral sensations includes a tactile sensation.

In some embodiments of the invention, the oral timer is substantially deprived of any pharmaceutically active ingredient.

In some embodiments of the invention, the human subject uses the first and second oral sensations to perform an activity for the predetermined duration, the human subject starting the activity when the first oral sensation is initiated and the human subject stopping the activity when the second oral sensation is initiated. For example, the activity is a physical activity or a meditation.

In another broad aspect, the invention provides an oral timer, the oral timer being configured and sized so as to be insertable in a human mouth, the oral timer comprising a compacted powder including: from about 90% to about 97% of sorbitol; from about 0.3% to about 1% of magnesium stearate; from about 0.1% to about 2% of Salvia Hispanica; and from about 0% to about 5% of flavoring agent.

In some embodiments of the invention, the compacted power includes about 95% of sorbitol, about 0.5% of magnesium stearate and from about 0.1% to about 1% of Salvia Hispanica.

In some embodiments of the invention, the compacted powder is substantially devoid of pharmaceutically active ingredients.

In some embodiments of the invention, the compacted powder is a first compacted powder, the oral timer further comprising a second compacted powder surrounding the first compacted powder, the second compacted powder differing in composition from the first compacted powder.

In some embodiments of the invention, the first and second compacted powders have different saliva dissolution rate, for example by having different densities.

In some embodiments of the invention, the first and second compacted powders have different tastes.

In some embodiments of the invention, the first and second compacted powders have different textures.

In some embodiments of the invention, the first and second compacted powders have different total dissolution time.

In some embodiments of the invention, the first compacted powder defines an internal layer and the second compacted powder defines an external layer surrounding the internal layer.

In some embodiments of the invention, the internal layer defines an internal layer outer surface at an interface between the internal and external layers, the internal layer outer surface having a predetermined textural characteristic. For example, the predetermined textural characteristic differs from a smooth uniform surface.

In some embodiments of the invention, the internal and external layers have different shapes.

In some embodiments of the invention, the first compacted powder is in the form of granules.

In some embodiments of the invention, the compacted powder is a first compacted powder, the first compacted powder defining a connected oral timer element provided with grooves defining thinned out portions thinner relative to the remainder of the oral timer, the second compacted powder filling the grooves, the second compacted powder being more saliva soluble than the first compacted powder.

In some embodiments of the invention, the compacted powder has a granulometry of between about 100 microns and about 425 microns.

In some embodiments of the invention, the compacted powder has been compacted at a pressure between about 1 and about 3 MPa.

In yet another broad aspect, the invention provides an oral timer for allowing a human subject having a mouth to time a predetermined duration, the mouth producing saliva, the oral timer including a saliva dissolving portion, the saliva dissolving portion being formulated, configured and sized such that a dissolution time required to dissolve at least part of the saliva dissolving portion is substantially independent of a natural physico-chemical environment in the mouth in the human subject when the human subject is healthy, the dissolution time being the predetermined duration. For example, the oral timer is made of a compacted powder.

In yet another broad aspect, the invention provides a kit including a predetermined number of oral timers for allowing a human subject having a mouth to time a respective predetermined duration for each of the oral timers, the mouth producing saliva, the oral timer including a saliva dissolving portion, the saliva dissolving portion being formulated, configured and sized such that a dissolution time required to dissolve the at least part of the saliva dissolving portion is substantially independent of a natural physico-chemical environment in the mouth in the human subject when the human subject is healthy, the dissolution time being the predetermined duration.

In some embodiments of the invention, the kit further comprises an instruction booklet including a list of activities to perform during the predetermined duration.

In some embodiments of the invention, at least two of the oral timers have the predetermined durations that differ from each other.

In a broad aspect, the present invention provides a new and improved oral timer usable for generating an indication to a human subject that a predetermined time period, or each of predetermined time periods in a series of sequentially occurring time periods defined in the device, has elapsed.

The invention is represented in some embodiments by an oral timer having the general form of a mouth dissolving pill, tablet or caplet that is maintained in the mouth of a human subject until a human subject selected portion, or the entirety of the pill, has dissolved in the mouth.

The oral timer is characterized in that when the predetermined duration has elapsed, between predetermined first and second transitional events, the manner of indicating that information to a human subject requires significantly less sensory interaction than conventional timer devices such as with the visual and/or hearing senses of the human subject. Instead, what are relatively softly solicited are the senses of taste, touch and/or texture detected mainly by the tongue of the human subject as the pill progressively dissolves in the mouth.

It is important to note that selected characteristics of the embodiments of an oral timer, as described above, may further significantly reduce altering factors such as, for example, amount and acidity level of the saliva present in the mouth, the tongue pressure and/or tongue activity applied on the oral timer that may differ between individuals that are using an oral timer having a same dissolution time.

Advantageously, the proposed oral timer can be manufactured relatively inexpensively using ingredients that are safe for human consumption.

Other objects, advantages and features of the present invention will become more apparent upon reading of the following non-restrictive description of some embodiments thereof, given by way of example only with reference to the accompanying drawings.

DETAILED DESCRIPTION

FIG. 1A to FIG. 6C inclusively, illustrate various aspects and features of embodiments of an oral timer in accordance with the present invention. These embodiments and features can be combined in any suitable manner as the person skilled in the art will realize. In addition, the terms "about" and "substantially" are used throughout this document to indicate variations in the thus qualifies terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art.

In a broad aspect, the present invention provides a new oral timer usable for generating an indication to a human subject that the end of a predetermined duration, or that multiple predetermined durations in a series of sequentially occurring time periods defined in the device, has elapsed.

More specifically, the invention concerns an oral timer for allowing a human subject having a mouth to time one or more predetermined durations. In some embodiments, the oral timer includes a saliva dissolving portion dissolving in the saliva produced in the mouth of the human subject. The saliva dissolving portion is formulated, configured and sized such that a dissolution time required to dissolve at least part of the saliva dissolving portion is substantially independent of a natural physico-chemical environment in the mouth in the human subject when the human subject is healthy. The dissolution time thus defined is the predetermined duration to indicate.

In these embodiments, the invention is represented by an oral timer having the general form of a mouth dissolving pill, tablet or caplet that is maintained in the mouth of the human subject until a selected portion thereof, or the entirety thereof, has dissolved in the mouth through the action of saliva. However, in alternative embodiments of the invention, oral sensations are created to indicate the beginning and end of the predetermined duration using any other suitable manner, such a for example by having a mouth insertable balloon that can be inflated or deflated to indicate various events or, in another example, by an electrode creating currents in the mouth that stimulate nerve endings. In this later case, the sensations created can be simulated tactile sensations, or taste sensations, such as sweet, salty, bitter, sour and umani. While such simulated sensation devices are within the scope of the present invention, the remainder of this document is concerned with a specific case in which the oral timer includes a compacted powder that is at least partially soluble in saliva.

The oral timer is characterized in that when a predetermined duration has elapsed, between predetermined first and second transitional events, the means to indicate that information to a human subject requires significantly less sensory interaction than conventional timer devices such as with the visual and/or hearing senses of the human subject as in timer devices of the prior art. Instead, what are relatively softly solicited are the senses of taste, touch and/or texture detected majoritarily by the tongue of the human subject.

The first and second transitional events create in the mouth of the human subject the first and second oral sensations. The second oral sensation is created by the oral timer after at least part of the saliva dissolving portion has been dissolved in the saliva.

Typically, a first predetermined transitional event is represented by the moment when the human subject introduces the oral timer into his or her mouth. In this case, the first oral sensation is an insertion of the oral timer in the mouth. In the case of an oral timer allowing to identify the end of a single predetermined time period, after a single predetermined duration, the human subject may identify a second predetermined transitional event when the pill has substantially completely dissolved in the mouth after a predetermined lapse of time. In this case, the second oral sensation is a complete dissolution of the oral timer in the saliva. In particular cases, for example, the predetermined duration corresponds to the length of time between the instant the human subject has introduced the pill in the mouth, and the moment when the pill is first felt as having a completely dissolved state.

Furthermore, in this particular case, the oral timer may have one or more selected characteristics of general shape configuration, surface configuration, size, composition and/or density that allows the pill to dissolve in the mouth of the human subject over the predetermined duration. The characteristics may be selected to significantly reduce the effect of altering factors such as the amount and acidity level of the saliva present in the mouth, the tongue pressure and/or tongue activity applied on the pill that may differ between individuals that are using an oral timer having a same dissolution time.

Figure 1A:
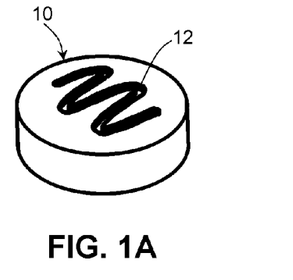
FIG. 1A, in a perspective view, illustrates an exemplary outer shape configuration of an oral timer in accordance with an embodiment of the present invention.
Figure 1B:
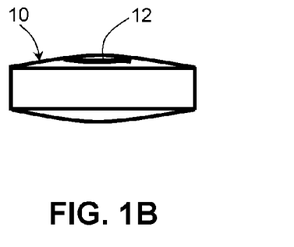
FIG. 1B, in a side elevational view, illustrates the oral timer shown in FIG. 1A.
Figure 1C:
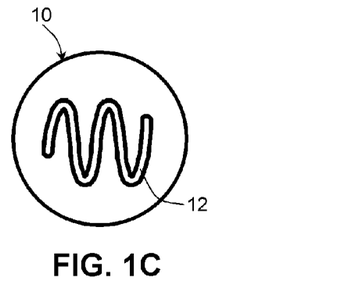
FIG. 1C, in a top plan view, illustrates the oral timer shown in FIGS. 1A and 1B.
Figure 2A:
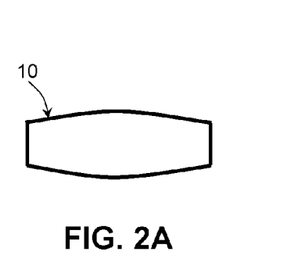
FIG. 2A, in a cross-sectional side view, illustrates an oral timer in accordance with an alternative embodiment of the present invention, the oral timer having a substantially uniform composition.

An oral timer allowing a human subject to identify the end of a single predetermined time period may be exemplified by a mouth dissolving pill 10 made of a single composition, as illustrated in cross-sectional view in FIG. 2A. In this particular embodiment, the mouth dissolving pill 10 may have a conventional rounded shape, such as those illustrated in FIGS. 1A to 1C. The pill has a relatively small diameter and thickness to minimize contact with the saliva and inner portions of the mouth, including the tongue of the human subject. Thus, with these characteristics, the altering factors that may affect the dissolution time between human subjects, as described above, may be significantly minimized.

Furthermore, the characteristics of volume and/or density of the composition may be suitably selected in order to obtain a desired dissolution time for the pill 10.

Alternatively or concurrently with the characteristics of volume and density as described above, the dissolution time of the pill 10 may be preset through the use of embossing 12, or surface grooves, that are provided along selected surface portions of the pill 10, as exemplified in FIG. 1A to 1C. Thus, the configuration and depth of the embossing 12 may be suitably selected to provide a desired dissolution time for the pill 10.

Figure 6A:
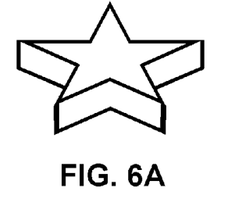
FIG. 6A, in a perspective view, illustrates an oral timer in accordance with yet another alternative embodiment of the present invention, the oral timer being generally star-shaped.
Figure 6B:
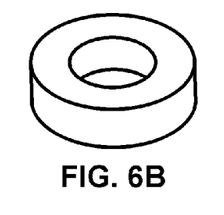
FIG. 6B, in a perspective view, illustrates an oral timer in accordance with yet another alternative embodiment of the present invention, the oral timer being generally annular.
Figure 6C:
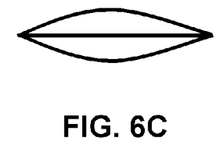
FIG. 6C in a side elevational view, illustrates an oral timer in accordance with yet another alternative embodiment of the present invention, the oral timer being generally lenticular.

Furthermore, alternatively or concurrently with the characteristics of volume, density and surface embossing, as described above, the dissolution time of the pill 10 may further be preset through the general outer shape configuration of the pill 10. For example, the pill 10 may have another configuration than the conventional rounded pill such as, for example, a substantially star, annular, or lenticular shaped configurations, as illustrated in FIGS. 6A, 6B and 6C respectively.

A typical configuration for an oral timer allowing a human subject to identify the end of a single predetermined time period may be represented, as illustrated in FIGS. 1A, 1B 1C and 2A, by a substantially rounded pill 10 made of a single, non medicinal composition such as, for example, a composition that includes more than 50% sorbitol and one or more non medicinal ingredients, for providing desired characteristics of taste and/or surface texture throughout the pill as it dissolves in the mouth.

For example, it has been found that an oral timer configured and sized so as to be insertable in a human mouth and comprising a compacted powder including: from about 94% to about 99% of sorbitol; from about 0.001% to about 1% of magnesium stearate; from about 0.1% to about 1% of Salvia Hispanica; and from about 0.3% to about 2% of flavoring agent is well suited for this purpose. Notably, the addition of Salvia Hispanica, which is absent from candies and other known conventional saliva dissolving foods, has been found to improve the reproducibility of dissolution time between different human subjects. In a more specific embodiment of the invention, the compacted power includes about 95% of sorbitol, about 0.5% of magnesium stearate and from about 0.1% to about 1% of Salvia Hispanica. Of course, oral timers having other compositions are within the scope of the present invention.

Also, in opposition to existing drug delivery devices that may dissolve in the mouth, the oral timer is typically substantially devoid of pharmaceutically active ingredients. Such pharmaceutically active ingredients are compounds that have a therapeutic or prophylactic effect on on the human body. While traces of these compounds may be found in the oral timer, the oral timer does not include enough of the compounds to provide a significant therapeutic or prophylactic effect. To use language commonly found in the art of therapeutic pills, the oral timer does not include a therapeutic amount of a drug or other pharmacologically active substance. Such substances include substances that are regulated by national or regional governmental agencies, such as the Food and Drug Administration (FDA) in the United States of America or Health Canada in Canada, and which require a license to be manufactured and sold, the license being associated with indications for which the substance can be prescribed by a medical doctor.

An exemplary embodiment of the pill 10 may have a diameter of about 7.2 mm and a thickness of about 4.3 mm, with 0.2 mm deep embossing 12 having a zigzag shape configuration, for example, such as illustrated in FIGS. 1A to 1C, that is extending along one side surface. With these dimensions, the pill may be made of sorbitol and other ingredients having a density such that the pill, having the dimensions cited above, weights about 180 mg. Such pill may typically dissolve completely in the mouth of a human subject in about 90 seconds substantially independently of altering factors that may exist between human subjects such as saliva characteristics and mouth and tongue activity.

In some embodiments of an oral timer, as described above, its composition may further include flavor and color additives conventionally used in the manufacturing of candies and the like.

In some embodiments, manufacturing of the oral timer in the form of the pill 10 may be performed by mixing and compacting the components thereof, called ingredients hereinbelow, in the form of powders. More specifically, first, the ingredients are ground or otherwise mechanically altered to achieve a predetermined granulometry. For example, a granulometry of between about 100 microns and about 425 microns for the sorbitol portion has been found advantageous. Then, the ingredients are mixed. Afterward, the individual pills 10 are formed by compacting the mixed powder at a predetermined pressure. For example, compacting with a pressure from about 1 MPa to about 3 MPa, for example 2.1 MPa+/− 0.2 MPa has been found advantageous. Then, if needed, the pills 10 are coated with a stability enhancing compound, and if a surface texture is required, this surface texture is punched.

Figure 2B:
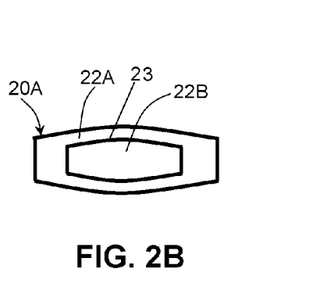
FIG. 2B, in a cross-sectional side view, illustrates an oral timer in accordance with another alternative embodiment of the present invention, the oral timer having two inner composition layers.
Figure 2C:
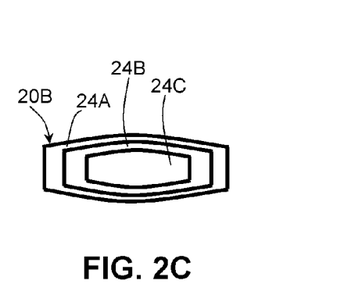
FIG. 2C, in a cross-sectional side view, illustrates an oral timer in accordance with yet another alternative embodiment of the present invention, the oral timer having three inner composition layers.

FIGS. 2B and 2C illustrate alternate embodiments 20A and 20B respectively, representing an oral timer according to the present invention. In these present embodiments, the mouth dissolving pills 20A and 20B allows to identify the end of each predetermined time period, in a series of subsequently elapsing time periods defined within a same pill 20A and 20B. The human subject may identify the end of each period through the detection of one or more subsequent transitional events that are represented by selected differentiated characteristics of shape, taste, touch and/or texture detected majoritarily by the tongue of a human subject, along surface portions of the pill 20A and 20B. These transitional events are sequentially occurring as the surface portions progressively dissolve in the mouth, and which may also include the last transitional event to a completely dissolved state of the pill.

To achieve the detection of the end of each one of the serially occurring time periods defined within the pill, the latter is composed of two or more concentrically disposed layers, or coatings, such as, for example, external layer 22A, and internal layer 22B, as exemplified in FIG. 2B or, likewise, external layer 24A, intermediate layer 24B and internal layer 24C, as exemplified in FIG. 2C. The oral timer initiates one of the first and second oral sensations when the external layer 22A or 24A, or the intermediate layer 24B, has been dissolved in the mouth to expose respectively the intermediate or internal layers 24B or 22B, or the internal layer 24C. Each layer 22A, 24A, 22B, 24B and 24C may have selected characteristics of composition, volume and density that are similar to the first embodiment of an oral timer, as described further above, with each layer 22A, 24A, 22B, 24B and 24C independently having characteristics being suitably selected for defining a predetermined duration required to dissolve in the mouth of the human subject.

For example, the pill 20A can be used to time a first predetermined duration and a second predetermined duration. A first oral sensation, marking the beginning of the first predetermined duration, is created when the external layer 22A is intact and the pill 20A in inserted in the mouth. A second oral sensation, marking the end of the first predetermined duration and beginning of the second predetermined duration, is created when the external layer 22A has been dissolved in the mouth to expose the internal layer 22B. The oral timer initiates a third oral sensation in the mouth of the human subject to indicate the end of the second predetermined duration, the third oral sensation differing from the second oral sensation. Initiation of the second and third oral sensations are separated in time by substantially the second predetermined duration. For example, the third oral sensation is the complete dissolution of the internal layer 22B.

In some embodiments, the characteristics determining the dissolution time for each layer 22A, 24A, 22B, 24B and 24C may be selected such that some or all the layers 22A, 24A, 22B, 24B and 24C in a same oral timer may be configured to dissolve in substantially a same length of time. Alternatively, some or all the layers 22A, 24A, 22B, 24B and 24C, may be configured to dissolve in differentiated lengths of time relative to other layers in the oral timer. Such configurations may be usable to suit a particular activity of a human subject comprising, for example, multiple timed steps of equal, differentiated, or a combination of equal and differentiated time periods.

In other words, each layer 22A, 24A, 22B, 24B and 24C has a composition that differs from the composition of another layer 22A, 24A, 22B, 24B and 24C provided just outside thereof and is made of a respective compacted powder. In some embodiments, the first and second compacted powders have different saliva dissolution duration. This may be achieved through differences in dissolution rate, caused by differences in composition or density, or through differences in dimensions. In some embodiments, the compacted powders forming the different layers have different tastes, different textures or both different tastes and textures.

Furthermore, each layer 22A, 24A, 22B, 24B and 24C is preferably distinctively differentiable relative to the adjacent layer 22A, 24A, 22B, 24B and 24C or layers 22A, 24A, 22B, 24B and 24C by the senses of taste, touch and/or texture felt by the tongue of the human subject as the surface of the pill 20A and 20B progressively dissolves through each successive layer 22A, 24A, 22B, 24B and 24C in the mouth, thus defining a transitional event between two adjacent layers 22A, 24A, 22B, 24B and 24C. For example, the internal layer 22B defines an internal layer outer surface 23 at an interface between the internal and external layers 22A and 22B, the internal layer outer surface 23 having a predetermined textural characteristic. In a specific embodiment, the predetermined textural characteristic differs from a smooth uniform surface. Also, in other embodiments, the internal and external layers 22A and 22B have different shapes.

A transitional event may be defined as being as soon as the first detection of the predetermined characteristics of taste, touch and/or texture that differentiate a layer 24A, 24B and 24C is felt by the human subject as protruding from the melting surface of another layer 22A, 24 and 24B located peripherally relative thereto. As described hereinabove, such transitional events may concurrently define the end of a predetermined time period of the oral timer, and the beginning of the subsequent one.

Alternatively or additionally to the transitional event described above, a transitional event may as well be defined as being when the predetermined characteristics of taste and/ or texture of an arbitrary layer 22A, 24A, 22B, 24B and 24C are no more felt in the mouth of the human subject, a situation that may occur between two adjacently concentric or the innermost layers 22A, 24A, 22B, 24B and 24C have completely dissolved.

The taste may alternatively vary between concentrically adjacent layers 22A, 24A, 22B, 24B and 24C with distinctively differentiable tastes such as, for example, sugary, salty, sour, peach, orange, cherry and the likes. Alternatively or concurrently with the distinctively differentiable tastes, the texture of each concentrically adjacent layers 22A, 24A, 22B, 24B and 24C may also vary between smooth, rough, granular, porous and the likes.

Figure 3A:
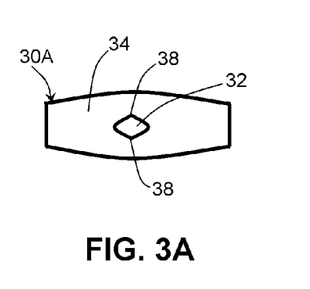
FIG. 3A, in a cross-sectional side view, illustrates an oral timer in accordance with yet another alternative embodiment of the invention, the oral timer having one sharp edged element embedded therein.
Figure 3B:
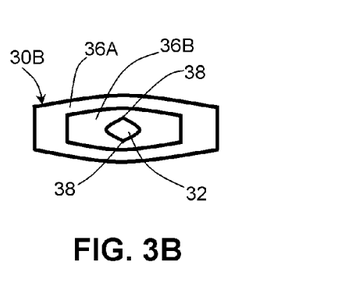
FIG. 3B, in a cross-sectional side view, illustrates an oral timer in accordance with yet another alternative embodiment of the invention, the oral timer having two layers and a sharp edged element embedded therein.
Figure 3C:
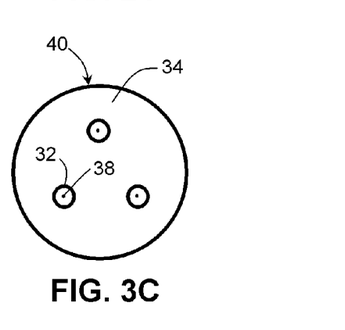
FIG. 3C, in a top cross-sectional plan view, illustrates an oral timer in accordance with yet another alternative embodiment of the present invention, the oral timer having more than one sharp edged elements embedded therein.

FIGS. 3A, 3B and 3C illustrate other embodiments 30A, 30B and 40 respectively, of an oral timer according to the present invention. In these embodiments, alternatively, or additionally to selected characteristics of the previous embodiments of an oral timer defining one, or more than one time period, a pill 30A, 30B or 40 may further include one or more than one beads (or granules) 32 that may be partially or fully embedded within the saliva soluble parts 34 (for pills 30A and 40) or 36A and 36B (for pill 30B) included in the oral timer.

Each bead 32 preferably has selected characteristics such as, for example, density, that provide the bead 32 with a dissolving time that is relatively longer than the dissolving time of the composition in which the bead 32 or beads 32 are embedded. Thus, as the embedding composition dissolves, a transitional event may be defined, for example, as soon as a surface portion of the bead 32 is detected as protruding through a surface portion of the dissolving embedding composition.

Furthermore, each bead 32 may define relatively sharp edges or acute pointed ends 38 that are suitably disposed within the embedding composition such that they are substantially the first portions of the bead 32 to protrude through the embedding composition as it dissolves.

As exemplified in FIGS. 3A and 3B, a bead 32 may be embedded in an oral timer comprising a single layer 34, or more than one layer 36A and 36B respectively. Thus, the transitional event provided by the bead 32 is added to other transitional events of the oral timer that may be defined by one or more layers 34, 36A and 36B having differentiable taste, touch and/or texture, as described further above.

In an alternate embodiment 40 of an oral timer, as exemplified in FIG. 3C, the device may comprise more than one bead 32 that are preferably spaced apart from each other within the embedding composition 34. Thus, additional transitional events may be defined with the individual and/or combined detection of their respective protruding portion through the embedding composition 34.

Figure 4A:
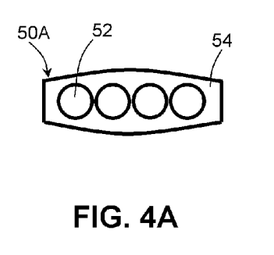
FIG. 4A, in a cross-sectional side view, illustrates an oral timer in accordance with yet another alternative embodiment of the present invention, the oral timer having a plurality of embedded spherical elements disposed in a first configuration therein.
Figure 4B:
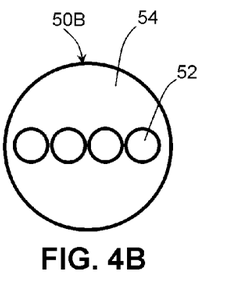
FIG. 4B, in a top cross-sectional plan view, illustrates an oral timer in accordance with yet another alternative embodiment of the present invention, the oral timer having a plurality of embedded spherical elements disposed in a second configuration therein.
Figure 4C:
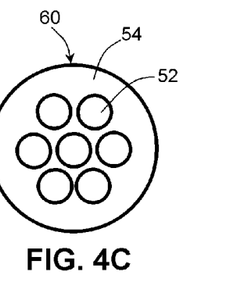
FIG. 4C, in a top cross-sectional plan view, illustrates an oral timer in accordance with yet another alternative embodiment of the present invention, the oral timer having a plurality of embedded spherical elements disposed in a third configuration therein.

FIGS. 4A, 4B and 4C illustrate other embodiments 50A, 50B and 60 respectively, of an oral timer according to the present invention. In the present embodiments, likewise the previously described embodiments comprising beads 32, the device may include two or more beads 52 having a dissolving time that is relatively longer than the dissolving time of the layer composition 54 in which the beads 52 are embedded. The beads 52 may have identical or individually varied shapes, including spherical as illustrated in the figures.

The present embodiments are characterized in that the beads 52 are closely juxtaposed relative to one another such that the tongue of the human subject may not have access to the layer composition 54 therebetween. Thus, the dissolving time of the interstitial layer composition 54 bonding two adjacent beads is relatively unaffected by the tongue activity applied by the human subject on the device. This characteristic, in turn, may significantly reduce the difference of time period that may occur between transitional events that are associated with a dissolving or breaking bond between two adjacent beads 52, as experienced by two human subjects dissolving identical oral timers.

A transitional event may be associated with the occurrence of the dissolving or breaking of at least one bond between two adjacent beads 52. Alternatively or additionally to the previously described transitional event, a transitional event may be defined when all the bonds between the beads 52 have dissolved or broken.

Figure 5A:
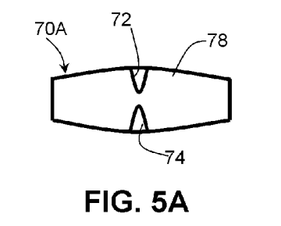
FIG. 5A, in a cross-sectional side view, illustrates an oral timer in accordance with yet another alternative embodiment of the present invention, the oral timer having a pair of substantially in register grooves filled with a relatively faster dissolving composition than the surrounding composition.
Figure 5B:
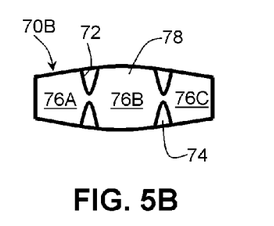
FIG. 5B, in a cross-sectional side view, illustrates an oral timer in accordance with yet another alternative embodiment of the present invention, the oral timer having two pairs of substantially in register grooves filled with a relatively faster dissolving composition than the surrounding composition.
Figure 5C:
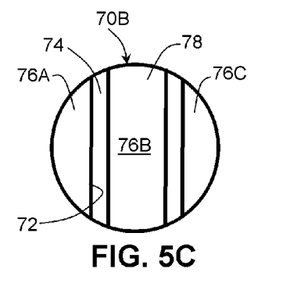
FIG. 5C, in a top cross-sectional plan view, illustrates the oral timer shown in FIG. 5B.

FIGS. 5A, 5B and 5C illustrate yet other embodiments 70A (in FIG. 5A) and 70B (in FIGS. 5B and 5C), of an oral timer according to the present invention. In the present embodiments, alternatively, or additionally to selected characteristics of the previous embodiments of an oral timer, as described above, a pill 70A and 70B may further include one or more grooves 72 extending across selected surface portions of the pill 70A and 70B. More specifically, a first compacted powder 78 defines a connected oral timer element provided with grooves 72 defining thinned out portions thinner relative to the remainder of the oral timer. The second compacted powder 74 fills the grooves 72 and is more saliva soluble than the first compacted powder 78.

These grooves 72 are for example substantially rectilinear and extend for example substantially parallel to each other across at least one, or correspondingly across oppositely oriented surfaces of the pill 70A and 70B representing the oral timer, thus defining, for example, adjacent body portions 76A, 76B and 76C, as illustrated in the FIGS. 5B and 5C. Furthermore, these grooves 72 preferably extend relatively deep within the surface of the pill 70A and 70B, and are filled with a second compacted powder 74 having a dissolution time that is relatively shorter than the surrounding first compacted powder 78 through which they extend.

As the second compacted powder 74 dissolves relatively faster than the first compacted powder 78, the strength of the bond between two adjacent body portions 76A, 76B and 76C is significantly weakened to a point where the latter may substantially easily break apart. Thus, one or more transitional events may be defined as soon as one or more adjacent body portions 76A, 76B and 76C break apart.

Thus, the present embodiments provide an additional means for significantly reducing the difference of time period that may occur between transitional events defined in an oral timer since the second compacted powder 74 is relatively unaffected, for example, by the tongue activity of the human subject.

In alternate embodiments, second compacted powders 74 that are filling different grooves 72 may have different dissolving times, hence allowing the definition of additional transitional events.

Optionally, the oral timer of the present invention may be distributed as a kit in which a plurality of oral timers are accompanied with an instruction booklet which details the transitional events, such as the transition events of taste, touch and/or texture that the human subject can expect while the oral timers are progressively dissolving in the mouth. Also, the instruction booklet may list activities to perform during each time period. Each transitional event is associated with the beginning and/or end of a predetermined time period, or each one of the predetermined time periods in sequentially occurring time periods defined within a given oral timer. In some embodiments, at least two of the oral timers have the predetermined durations that differ from each other. For example, the predetermined durations may be provided in incremental steps so that the activities may be performed for longer durations as the human subject gains experience.

Figure 7:
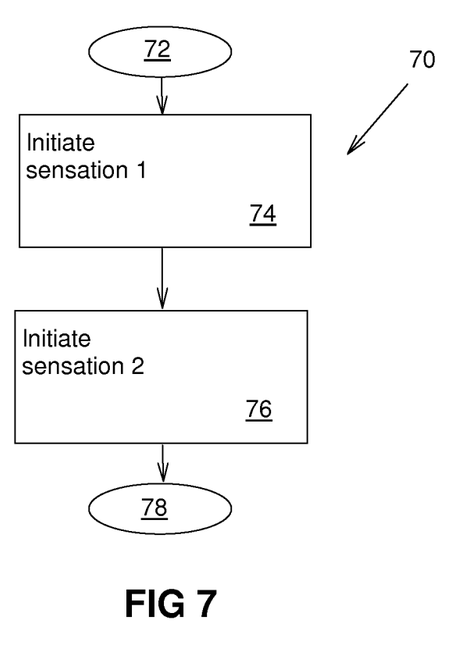
FIG. 7, in a flowchart, illustrates a method of using the oral timers shown in FIGS. 1 to 6C.

A method 70 of using the oral timer of the present invention will now be described with reference to FIG. 7. First, the method starts at step 72. Then, at step 74, a first oral sensation is initiated in the mouth of the human subject to indicate a beginning of the predetermined duration. Afterward, at step 76, a second oral sensation is initiated in the mouth of the human subject to indicate an end of the predetermined duration, the second oral sensation differing from the first oral sensation. Initiations of the first and second oral sensations are separated in time by at least substantially the predetermined duration. The first and second oral sensations may last for a relatively long time as it it typically the initiation, or beginning, of the first and second oral sensations that is registered to mark the predetermined duration. As detailed hereinabove, the first and second oral sensations includes at least one of a taste sensation and a tactile sensation. The method finally ends at step 78.

The human subject typically uses the first and second oral sensations to perform an activity for the predetermined duration. For example, the human subject starts the activity when the first oral sensation is initiated and the human subject stops the activity when the second oral sensation is initiated. Examples of such activities include a physical activity and meditation, among other possibilities. While in some subjects the length of time measured using the oral timer will vary from that measured in other subjects, it is possible to formulate the oral timer such that in all subjects a minimal time that does not differ too much from an average, or nominal, time is measured. Performing the activity for longer than the minimal time is usually not problematic as one usually needs to ensure that an activity for which duration is monitored using the oral timer is performed for a minimal amount of time, with any extra time considered an advantage.

The above method 70 may be useful, for example, for conditioning the nervous system of a patient to adopt a positive attitude and emotional stability, thereby overcoming daily stress and anxiety using a meditation method. Furthermore, the meditation method may be used for conditioning of the nervous system to promote overall wellness or for psychotherapeutic reinforcements. Implementation of the meditation method may further strengthen the immune system and promotes emotional and physical homeostasis.

The meditation method is preferably to be performed at least twice a day over several days. For example, the method may be preferably performed twice a day for, typically, seven (7), fourteen (14) or twenty-one (21) days, and comprises the following steps.

In a first step, the patient learns several, illustratively three (3), autohypnosis sentences. Some sentences enable guided visualization of the patient's body, some lead to stronger emotional stability, while others enable the patient to be more aware and focused on actions occurring at the present time. The sentences may be different each day and, when meditated, are designed to result in the activation of the left brain hemisphere and of the parasympathetic system. Such autohypnosis sentences are well known in the art of meditation.

In a second step, the patient sits in a comfortable position, leaning against a wall or the like, thereby releasing the muscles and sympathetic nervous system.

In a third step, the patient executes a controlled breathing exercise to bring the brain to emit alpha waves. Such controlled breathing exercise is well known in the art of meditation.

In a fourth step, the patient takes the first embodiment of an oral timer allowing a single time period, as described further above, and allows it to melt in the mouth. The oral timer is designed to melt in a single predetermined period of time, for example, 90 seconds, during which the patient meditates the sentences learned at the first step.

An alternate embodiment of the previously described method is characterized in that the last or fourth step of the method is modified as follows.

The patient takes one of the embodiments of an oral timer allowing to identify more than one subsequent time period, as described further above, and allows it to melt in the mouth. The oral timer is designed to melt in a predetermined sequence of time periods, for example, 20 seconds, 40 seconds and 30 seconds, over a total dissolving time of 90 seconds, during which the patient meditates predetermined sentences learned at the first step that are associated with each sequential time period allowed by the device. Thus, emphasis may be put on the meditation of selected sentences rather than others.

EXAMPLE

An oral timer having the following composition has been manufactured using the following ingredients (in % w/w): sorbitol 98.8751%, citric acid 0.7415%, Magnesium stearate 0.0026%; orange flavor 0.3637%, color 0.0065%, and Salvia Hispanica 0.0108%. Sorbitol was ground to have grains between 105 and 425 microns and the other compounds were also in the form of powder. Since the other compounds are present in small quantities, granulometry did not need to be tightly controlled. Pills having a diameter of about 7 mm and a thickness of about 4.3 mm were manufactured by pressing the mixed ingredients at a pressure of about 2.1 MPa. The weight of each pill was about 0.18 g.

Dissolution time was measured in 20 subjects for three of the above described pills for each subject. The average dissolution time was 120.8 s with a standard deviation of 9.5 s. All dissolution times were larger than 90 secs.

Although the present invention has been described hereinabove by way of preferred embodiments thereof, it can be modified, without departing from the spirit and nature of the subject invention as defined in the appended claims.

What is claimed is:

1. A method for a human subject to time an occurrence having a predetermined duration using an oral timer soluble in the human subject's saliva, said method comprising:
    initiating a first oral sensation by inserting said oral time into the mouth of said human subject, wherein the first oral sensation indicates the beginning of the predetermined duration; and
    initiating a second oral sensation in the mouth of said human subject to indicate an end to the predetermined duration, the second oral sensation being initiated by said oral timer after at least part of said oral timer has been dissolved in said saliva;
    wherein the initiation of the first oral sensation and the initiation of the second oral sensation are separated in time by at least substantially said predetermined duration; and
    wherein said oral timer includes a compacted powder comprising:
        from about 94% to about 99% w/w of sorbitol;
        from about 0.001% to about 1% w/w of magnesium stearate;
        from about 0.1% to about 1% w/w of *Salvia Hispanica*; and
        from about 0.3% to about 2% w/w of a flavoring agent.

2. The method according to claim 1, wherein said first oral sensation is the feel or taste in said human subject's mouth of said oral timer being inserted therein.

3. The method according to claim 1, wherein said second oral sensation is the feel or taste of said oral timer at the point of it being completely dissolved in said saliva.

4. The method according to claim 1, wherein said oral timer includes an internal layer and an external layer surrounding said internal layer, said oral timer initiating one of said first and second oral sensations when said external layer has been dissolved in said human subject's mouth to expose said internal layer.

5. The method according to claim 4, wherein said one of said first and second oral sensations includes a taste sensation.

6. The method according to claim 4, wherein said one of said first and second oral sensations includes a tactile sensation.

7. The method according to claim 1, wherein said oral timer is substantially free of any pharmaceutically active ingredient.

8. The method according to claim 1, wherein said human subject meditates between the time of said occurrence.

9. A method for a human subject to time an occurrence having a first predetermined duration and a second predetermined duration using an oral timer soluble in the human subject's saliva, wherein the oral timer comprises an internal layer and an external layer surrounding the internal layer, said method comprising:
    initiating a first oral sensation by inserting said oral time into the mouth of said human subject, the first oral sensation being initiated when said external layer is intact and indicates the beginning of the first predetermined duration;
    initiating a second oral sensation in the mouth of said human subject to indicate an end to the first predetermined duration, the second oral sensation being initiated when said external layer has been dissolved in said saliva exposing said internal layer; and
    initiating a third oral sensation in the mouth of said human subject to indicate an end to the second predetermined duration;
    wherein the initiation of the first oral sensation and the initiation of the second oral sensation are separated in time by at least substantially the first predetermined duration, and the initiation of the second oral sensation and the initiation of the third oral sensation are separated in time by at least substantially said second predetermined duration; and
    wherein said oral timer includes a compacted powder comprising:
        from about 94% to about 99% w/w of sorbitol;
        from about 0.001% to about 1% w/w of magnesium stearate;
        from about 0.1% to about 1% w/w of *Salvia Hispanica*; and
        from about 0.3% to about 2% w/w of a flavoring agent.

* * * * *